(12) United States Patent
Nishita (10) Patent No.: US 9,581,442 B2
(45) Date of Patent: Feb. 28, 2017

(54) SURVEYING INSTRUMENT (71) Applicant: Kabushiki Kaisha TOPCON, Itabashi-ku, Tokyo-to (JP)

(72) Inventor: Nobuyuki Nishita, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 161 days.

(21) Appl. No.: 14/560,429

(22) Filed: Dec. 4, 2014

(65) Prior Publication Data
US 2015/0185008 A1 Jul. 2, 2015

(30) Foreign Application Priority Data
Dec. 27, 2013 (JP) .................................. 2013-271153

(51) Int. Cl.
*G01C 15/02* (2006.01)
*G01S 17/66* (2006.01)
(Continued)

(52) U.S. Cl.
CPC ............ *G01C 15/02* (2013.01); *G01C 15/002* (2013.01); *G01S 17/66* (2013.01); *G01C 9/02* (2013.01); *G01C 15/006* (2013.01); *G01C 15/06* (2013.01)

(58) Field of Classification Search
CPC ........ G01C 5/00; G01C 15/002; G01C 15/06; G01C 15/006; G01C 9/02; G01S 17/66
(Continued)

(56) References Cited

U.S. PATENT DOCUMENTS 3,970,391 A * 7/1976 Johnson ............... G01C 15/004
33/286
4,023,908 A * 5/1977 Johnson ............... G01C 15/004
33/293
(Continued)

FOREIGN PATENT DOCUMENTS

| EP | 2103905 A2 | 9/2009 |
| EP | 2503284 A2 | 9/2012 |
| JP | 7-198383 A | 8/1995 |

OTHER PUBLICATIONS

European communication dated Jun. 2, 2015 in corresponding European patent application No. 14198605.9.

*Primary Examiner* — R. A. Smith
*Assistant Examiner* — Tania Courson
(74) *Attorney, Agent, or Firm* — Nields, Lemack & Frame, LLC (57) ABSTRACT

The invention provides a surveying instrument capable of performing a non-prism measurement comprising a laser pointer for projecting a laser pointer beam, a measuring unit for emitting a distance measuring light via a telescope unit, for performing distance measurement on a measuring point by receiving a reflected light and for measuring an angle of the measuring point, an image pickup unit for acquiring an image including a target via the telescope unit, a tracking unit for emitting a tracking light via the telescope unit and for tracking the target by receiving a reflection light from the target, a driving unit for rotating the telescope unit in horizontal direction and in vertical direction and a control device for controlling the driving unit so that the reflection light of the tracking light from the target will be positioned at a predetermined position on an image pickup element of the image pickup unit, wherein an optical axis of the distance measuring light and an optical axis of the tracking light are in a known relationship and an optical axis of the (Continued)

laser pointer beam is offset from an optical axis of the tracking light by a predetermined angle.

6 Claims, 8 Drawing Sheets

(51) Int. Cl.
*G01C 15/06* (2006.01)
*G01C 15/00* (2006.01)
*G01C 9/02* (2006.01)

(58) Field of Classification Search
USPC .......... 33/228, 290–296, 354, 370, 809–812
See application file for complete search history.

(56) References Cited

U.S. PATENT DOCUMENTS

| | | | |
|---|---|---|---|
| 4,030,832 A * | 6/1977 | Rando | G01C 15/006 |
| | | | 33/293 |
| 6,137,569 A | 10/2000 | Sasaki et al. | |
| 7,228,635 B2 * | 6/2007 | Jian | G01C 15/004 |
| | | | 33/291 |
| 7,352,446 B2 * | 4/2008 | Bridges | G01B 11/024 |
| | | | 356/5.13 |
| 7,360,314 B2 * | 4/2008 | Haijima | G01C 15/002 |
| | | | 33/290 |
| 7,861,423 B2 * | 1/2011 | Kumagai | G01C 15/004 |
| | | | 33/281 |
| 7,965,383 B2 * | 6/2011 | Hayashi | G01C 15/004 |
| | | | 356/4.01 |
| 8,225,518 B2 * | 7/2012 | Yanobe | G01C 15/00 |
| | | | 33/292 |
| 8,881,412 B2 * | 11/2014 | Nishita | G01C 15/008 |
| | | | 33/290 |
| 9,273,960 B2 * | 3/2016 | Kumagai | G01C 15/002 |
| 2006/0066836 A1 | 3/2006 | Bridges et al. | |
| 2009/0235541 A1 * | 9/2009 | Kumagai | G01C 15/004 |
| | | | 33/281 |
| 2010/0186243 A1 * | 7/2010 | Schumacher | G01B 21/22 |
| | | | 33/228 |
| 2012/0057174 A1 | 3/2012 | Briggs | |
| 2014/0304994 A1 * | 10/2014 | Dumoulin | G01C 15/004 |
| | | | 33/228 |
| 2014/0338206 A1 * | 11/2014 | Kahle | G01C 15/06 |
| | | | 33/228 |
| 2014/0360031 A1 * | 12/2014 | Kahlow | G01C 15/06 |
| | | | 33/228 |
| 2015/0092183 A1 * | 4/2015 | Dumoulin | G01C 15/004 |
| | | | 356/4.07 |

* cited by examiner

SURVEYING INSTRUMENT

BACKGROUND OF THE INVENTION

The present invention relates to a surveying instrument, which has a laser pointer.

In a conventional type surveying instrument, when surveying operation is carried out, it has been practiced to perform sighting at first on a measuring point to be measured by using a telescope.

There are several methods to perform sighting using a conventional type surveying instrument. That is, a method to perform visual inspection for sighting on a measuring point by manually operating a telescope while watching into the telescope, a method to acquire an image by a camera built in a telescope and to sight by selecting the measuring point in the image acquired, a method to guide a surveying instrument to the measuring point by using the surveying instrument integrated with a laser pointer and by manually operating the surveying instrument while looking to a projecting point of a laser pointer, a method to control a projecting point of the laser pointer while watching the image and to guide the laser pointer to the measuring point, and other methods.

However, when watching into the telescope or when selecting the measuring point based on an image, since a visual field is limited, it is difficult to direct the telescope in the direction toward the measuring point at a place where a wall surface with few features and the same degree of brightness continuously exists, at a place with a periodic pattern, at a dark place, or the like.

Further, in a case where a laser pointer is directed from a surveying instrument main unit, it is difficult to accurately align the laser pointer with the measuring point if the point is separated by some distance. In a case where the laser pointer is guided by a controller, the movement of the laser pointer does not match the sense of the operator when the measuring point group is tilted, and it is difficult to guide the laser pointer.

Further, in a case where the measuring point is measured directly by a prism, it is necessary to correctly install the prism based on the relation between the measuring point and a constant offset, and this means that much troublesome procedure may be required.

In order to facilitate the guiding to the measuring point, a method is also known. According to this method, the operator moves himself with a prism to a point near the measuring point, using a surveying instrument which has a laser pointer and is capable of tracking the prism and the laser pointer beam projected from the laser pointer is guided to the measuring point. However, when using such type of surveying instrument, a tracking optical axis, a laser pointer optical axis and a distance measuring optical axis all coincide with respect to a visual axis, and the laser pointer beam is reflected by the prism without being projected to a wall surface or the like. As a result, a reflection light of the laser pointer beam cannot be visually inspected, and it is difficult to accurately guide according to the laser pointer.

SUMMARY OF THE INVENTION

It is an object of the present invention to provide a surveying instrument, by which it is possible to perform guidance to a measuring point in an easy and a reliable manner and to improve a working efficiency.

To attain the object as described above, a surveying instrument according to the present invention capable of performing a non-prism measurement comprises a laser pointer for projecting a laser pointer beam, a measuring unit for emitting a distance measuring light via a telescope unit, for performing distance measurement on a measuring point by receiving a reflected light and for measuring an angle of the measuring point, an image pickup unit for acquiring an image including a target via the telescope unit, a tracking unit for emitting a tracking light via the telescope unit and for tracking the target by receiving a reflection light from the target, a driving unit for rotating the telescope unit in horizontal direction and in vertical direction and a control device for controlling the driving unit so that the reflection light of the tracking light from the target will be positioned at a predetermined position on an image pickup element of the image pickup unit, wherein an optical axis of the distance measuring light and an optical axis of the tracking light are in a known relationship and an optical axis of the laser pointer beam is offset from an optical axis of the tracking light by a predetermined angle.

Further, in the surveying instrument according to the present invention, an optical axis of the distance measuring light of the measuring unit is coaxial with an optical axis of the laser pointer beam, the optical axis of the laser pointer beam is positioned at a center on the image pickup element and the optical axis of the tracking light is offset from the optical axis of the laser pointer beam.

Further, in the surveying instrument according to the present invention, the control device performs mask processing with respect to the image pickup element so that a photodetection signal of the reflection light of the laser pointer beam is not issued.

Further, in the surveying instrument according to the present invention, the optical axis of the distance measuring light of the measuring unit is coaxial with the optical axis of the tracking light, the optical axis of the laser pointer beam is offset from the optical axis of the tracking light, wherein after guiding the laser pointer beam to a measuring point, the control device controls the driving unit so that the optical axis of the distance measuring light is moved in order to turn a set up offset angle to 0.

Further, the surveying instrument according to the present invention further comprises a horizontal shaft for rotating the telescope unit in a vertical direction, an offset shaft relatively rotatable with respect to the horizontal shaft, an offset driving unit for rotating the offset shaft and a mirror installed on an end surface of the offset shaft and for reflecting the laser pointer beam, wherein an offset angle of the laser pointer beam is changed by relatively rotating the offset shaft with respect to the horizontal shaft.

Furthermore, the surveying instrument according to the present invention comprises a laser pointer for projecting a laser pointer beam, a measuring unit for emitting a distance measuring light via a telescope unit and for performing angle measurement of a measuring point by receiving a reflection light, an image pickup unit for acquiring an image including a target via the telescope unit, a tracking unit for tracking the target by emitting a tracking light via the telescope unit and by receiving a reflection light from the target, a driving unit for rotating the telescope unit in a horizontal direction and in a vertical direction, and a control device for controlling the driving unit so that a reflection light of the tracking light from the target is positioned at a predetermined position on an image pickup element of the image pickup unit and for performing of tracking the target, wherein an optical axis of the distance measuring light and an optical axis of the tracking light are in a known relationship and an optical axis of the laser pointer beam is offset from an optical axis of the tracking light by a predetermined angle.

According to the present invention, the surveying instrument capable of performing a non-prism measurement comprises a laser pointer for projecting a laser pointer beam, a measuring unit for emitting a distance measuring light via a telescope unit, for performing distance measurement on a measuring point by receiving a reflected light and for measuring an angle of the measuring point, an image pickup unit for acquiring an image including a target via the telescope unit, a tracking unit for emitting a tracking light via the telescope unit and for tracking the target by receiving a reflection light from the target, a driving unit for rotating the telescope unit in horizontal direction and in vertical direction and a control device for controlling the driving unit so that the reflection light of the tracking light from the target will be positioned at a predetermined position on an image pickup element of the image pickup unit, wherein an optical axis of the distance measuring light and an optical axis of the tracking light are in a known relationship and an optical axis of the laser pointer beam is offset from an optical axis of the tracking light by a predetermined angle. As a result, the laser pointer beam is projected without being reflected by the target, and the operator can guide the laser pointer beam to the measuring point in easy and reliable manner by visually inspecting the projecting point of the laser pointer beam and the measuring point, and this contributes to the improvement of working efficiency.

Further, according to the present invention, in the surveying instrument, an optical axis of the distance measuring light of the measuring unit is coaxial with an optical axis of the laser pointer beam, the optical axis of the laser pointer beam is positioned at a center on the image pickup element and the optical axis of the tracking light is offset from the optical axis of the laser pointer beam. As a result, it becomes possible to improve workability because there is no need to correct the position of an optical axis of the distance measuring light for performing the measurement after guiding the laser pointer beam to the measuring point.

Further, according to the present invention, in the surveying instrument, the control device performs mask processing with respect to the image pickup element so that a photodetection signal of the reflection light of the laser pointer beam is not issued. As a result, it becomes possible to prevent the reflection light of the laser pointer beam to be tracked at the time of tracking, and this contributes to the improvement of stability of the tracking of the target.

Further, according to the present invention, in the surveying instrument, the optical axis of the distance measuring light of the measuring unit is coaxial with the optical axis of the tracking light, the optical axis of the laser pointer beam is offset from the optical axis of the tracking light, wherein after guiding the laser pointer beam to a measuring point, the control device controls the driving unit so that the optical axis of the distance measuring light is moved in order to turn a set up offset angle to 0. As a result, there is no limitation on an offset angle between the optical axis of the tracking light and the optical axis of the laser pointer beam, and it is possible to guide the laser pointer beam to the measuring point and to perform measurement even in a case where guiding by manual operation is difficult to perform such as a case where the measuring point is on the ceiling, or the like.

Further, according to the present invention, the surveying instrument further comprises a horizontal shaft for rotating the telescope unit in a vertical direction, an offset shaft relatively rotatable with respect to the horizontal shaft, an offset driving unit for rotating the offset shaft and a mirror installed on an end surface of the offset shaft and for reflecting the laser pointer beam, wherein an offset angle of the laser pointer beam is changed by relatively rotating the offset shaft with respect to the horizontal shaft. As a result, it is possible to freely set up the offset angle depending on the position of the measuring point and to contribute to the improvement of working efficiency.

Furthermore, according to the present invention, the surveying instrument comprises a laser pointer for projecting a laser pointer beam, a measuring unit for emitting a distance measuring light via a telescope unit and for performing angle measurement of a measuring point by receiving a reflection light, an image pickup unit for acquiring an image including a target via the telescope unit, a tracking unit for tracking the target by emitting a tracking light via the telescope unit and by receiving a reflection light from the target, a driving unit for rotating the telescope unit in a horizontal direction and in a vertical direction, and a control device for controlling the driving unit so that a reflection light of the tracking light from the target is positioned at a predetermined position on an image pickup element of the image pickup unit and for performing of tracking the target, wherein an optical axis of the distance measuring light and an optical axis of the tracking light are in a known relationship and an optical axis of the laser pointer beam is offset from an optical axis of the tracking light by a predetermined angle. As a result, the laser pointer beam is projected without being reflected by the target and the operator can guide the laser pointer beam to the measuring point in easy and reliable manner while visually inspecting the projecting point of the laser pointer beam and the measuring point, and this makes it possible to contribute to the improvement of working efficiency.

BRIEF DESCRIPTION OF THE DRAWINGS

FIG. 7A and FIG. 7B are enlarged views of an essential portion of the surveying instrument according to a third embodiment of the present invention.

FIG. 8A and FIG. 8B are enlarged views of an essential portion of the surveying instrument which show a variation example of the third embodiment of the present invention.

DETAILED DESCRIPTION OF THE PREFERRED EMBODIMENTS

Description will be given below on an embodiment of the present invention by referring to the attached drawings.

First, by referring to FIG. 1 and FIG. 2, a description will be given below on a surveying instrument according to a first embodiment of the present invention.

Figure 1:
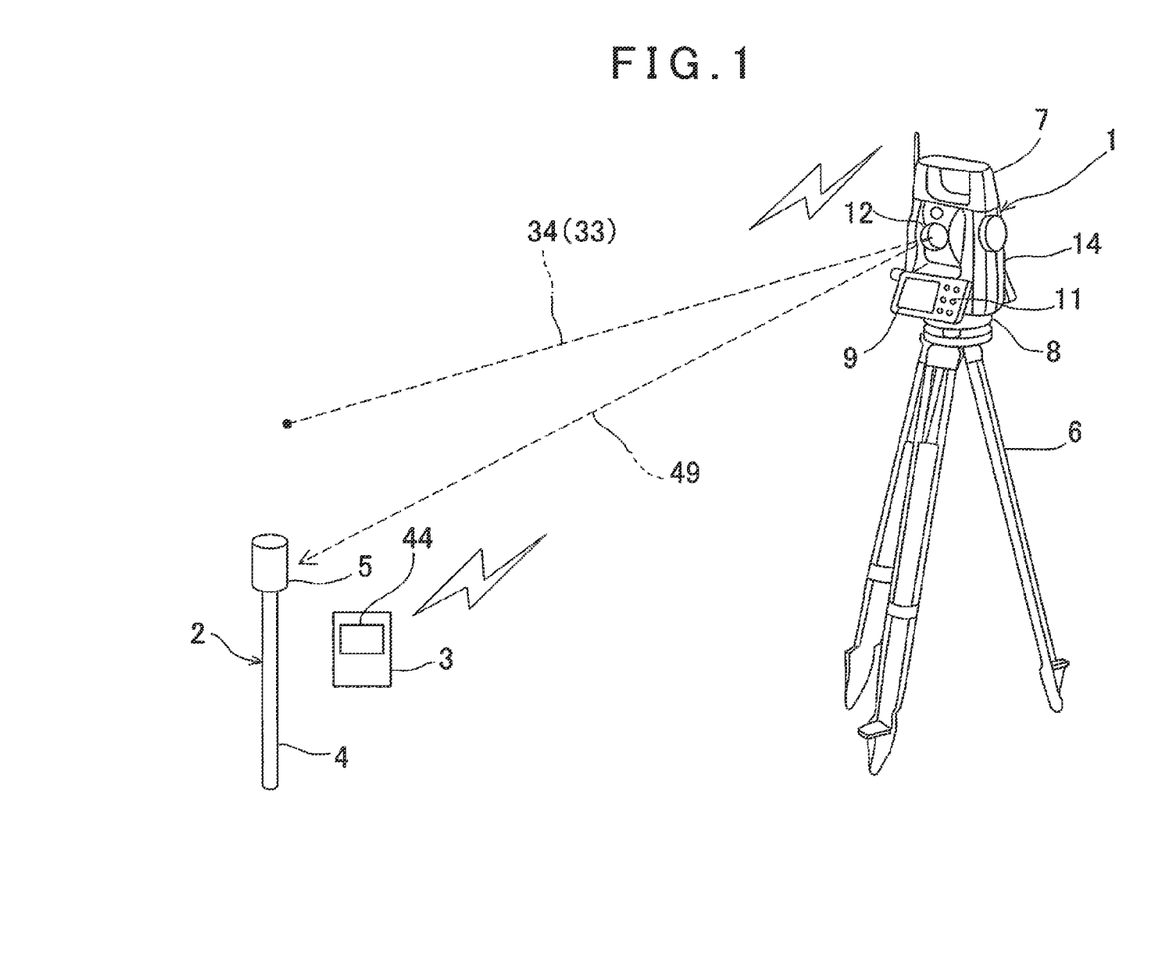
FIG. 1 is a schematical drawing to show a surveying instrument and a target.

In FIG. 1, reference numeral 1 denotes a surveying instrument such as a total station, reference numeral 2 denotes a target having a reflection member and reference numeral 3 denotes a controller, which is a portable terminal. Each of the surveying instrument 1 and the controller 3 has a communication unit respectively so that the controller 3 is capable of giving an instruction to the surveying instrument 1.

The target 2 has a rod-like support member 4 and a reflection member is provided at a forward end of the support member 4. As the reflection member, an omnidirectional prism 5 configured by a plurality of prisms in a triangular pyramid shape combined in radial arrangement is used. It is to be noted that the controller 3 may be designed as portable or handheld or may be integrated with the target 2.

The surveying instrument 1 has a surveying instrument main unit 7 and a horizontal rotary unit 8 and is installed at a known point via a supporting unit such as a tripod 6. The horizontal rotary unit 8 is adapted to rotate the surveying instrument main unit 7 in a horizontal direction over a total circumference of 360° around a vertical axis and a horizontal angle detector 10 is adapted to detect the amount of rotation, i.e. horizontal angle of the surveying instrument main unit 7. Further, the surveying instrument main unit 7 has a display unit 9 to display a measurement result, a condition of progress of the measurement, etc., and an operation unit 11 for setting up a measurement condition or a display operation of measurement result, or the like. It is to be noted that the display unit 9 is configured as a touch panel, and the touch panel may be used as both a display unit and an operation unit.

Figure 8A:
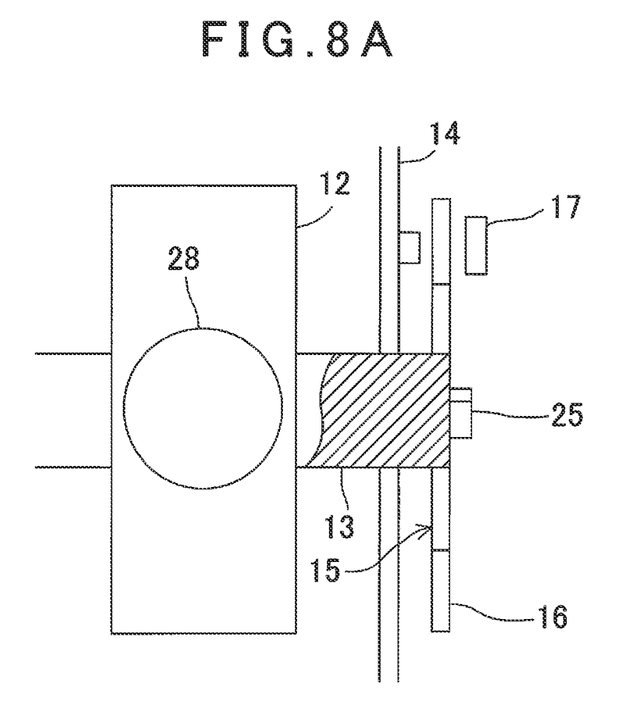
FIG. 8A shows a front view of the surveying instrument and FIG. 8B shows a side view of the surveying instrument.

The surveying instrument main unit 7 has a telescope unit 12 and the telescope unit 12 is supported by a casing 14 via a horizontal shaft 13 (see FIG. 8A). When the horizontal shaft 13 is driven by a horizontal shaft motor (not shown), the telescope unit 12 is designed to rotate in a vertical direction. The horizontal rotary unit 8 and the horizontal shaft motor make up together a driving unit, which rotates the telescope unit 12 in a horizontal direction and in a vertical direction.

The telescope unit 12 is provided with a sighting telescope (not shown). The sighting telescope has a visual field angle of about 5° and is capable of sighting the measuring point.

An image pickup unit 29 is incorporated in the telescope unit 12 and the image pickup unit 29 is capable of picking up an image through the sighting telescope. Further, the image pickup unit 29 has a CCD, a CMOS sensor, etc. as an image pickup element 31 (to be described later; See FIG. 3) and is configured to output a digital image data.

Further, an electro-optical distance meter (EDM) 32, a tracking unit 20, a laser pointer projecting unit 30 and an offset unit 40 are incorporated in the telescope unit 12.

The electro-optical distance meter 32 is adapted to carry out a prism measurement and a non-prism measurement, or at least the prism measurement. The electro-optical distance meter 32 projects a distance measuring light (invisible light) to an object to be measured via a distance measuring optical axis 33, a reflection light from the object to be measured is received by the image pickup element 31 and a distance measurement to the object to be measured is carried out based on the photodetection result. The tracking unit 20 has a tracking optical axis 49, a tracking light (invisible light) is projected on the tracking optical axis 49, a reflection light from an object to be tracked is received by the image pickup element 31, and configured so as to track the object to be tracked based on the photodetection result. Further, the laser pointer projecting unit 30 has a laser pointer optical axis 34 and is configured so as to project a visible laser beam (a laser pointer beam) on the laser pointer optical axis 34 and the laser beam is projected to the measuring point or to a point near the measuring point.

Further, it is so configured that the offset unit 40 is capable of setting up the tracking optical axis 49 with an offset angle as required with respect to the distance measuring optical axis 33 and the laser pointer optical axis 34. It is to be noted that in a case where the offset angle is fixed, the offset unit 40 may be omitted.

The electro-optical distance meter 32, the tracking unit 20 and the laser pointer beam projecting unit 30 commonly use the telescope unit 12 as an optical system and it is so configured that a distance measuring light, a tracking light and a laser pointer beam are projected from the telescope unit 12.

The first embodiment relates to a non-prism measurement. The distance measuring optical axis 33 and the laser pointer optical axis 34 coincide with each other and the tracking optical axis 49 is offset by an angle as required with respect to the distance measuring optical axis 33 and the laser pointer optical axis 34 by using the offset unit 40.

Inside the surveying instrument main unit 7, a control device 35 is provided. The control device 35 comprises an arithmetic part 36, a storage part 37, a communication unit 38, a motor driving unit 39, the display unit 9 and the operation unit 11.

Based on the operation input from the operation unit 11 or the controller 3, the arithmetic part 36 controls a horizontal rotation of the horizontal rotary unit 8 and controls a vertical rotation of the telescope unit 12, and is configured so as to carry out distance measurement by the electro-optical distance meter 32, to measure a horizontal angle and a vertical angle based on the detection results of the horizontal angle detector 10 and a vertical angle detector 18, and to acquire an image by the image pickup unit 29.

On the image pickup element 31, a coordinate system having an origin point at a point coincident with the distance measuring optical axis 33 is set up and a position of each of pixels to make up the image pickup element 31 is specified by the coordinate system.

The electro-optical distance meter 32, the horizontal angle detector 10 and the vertical angle detector 18 make up together a measuring unit.

Next, referring to FIG. 2, description will be given on a control system of the surveying instrument 1 and the controller 3.

In the storage part 37, various types of programs are stored. These programs include: a distance measuring program for carrying out distance measurement by controlling the electro-optical distance meter 32, an offset program for setting up an offset angle of the laser pointer optical axis 34 by driving and controlling the offset unit 40, a drive control program for driving the horizontal rotary unit 8 and a horizontal shaft motor, not shown, based on an operation input from the operation unit 11 or the controller 3, a tracking program for tracking the target 2 under a condition where an offset angle as set up is maintained, an image processing program for carrying out image processing on the images acquired by the image pickup unit 29, a communication program for controlling transmitting and receiving, and the like.

The communication unit 38 performs data communication of an operation command signal (command), a distance measurement data, an image data, etc. to and from a communication unit 43 (to be described later) as provided in the controller 3.

Based on the command from the arithmetic part 36, the motor driving unit 39 carries out driving and controlling of driving motors of the horizontal rotary unit 8 and the telescope unit 12, and an offset amount (offset angle) is set up by driving the offset unit 40.

Further, the controller 3 primarily comprises an arithmetic part 41, a storage part 42, the communication unit 43, a display unit 44 and an operation unit 45.

In the storage part 42, coordinates of the measuring points inputted in advance and programs such as a guiding information display program to display a guiding information up to the measuring point on the display unit 44 by comparing a position of the laser pointer optical axis 34 in the image sent from the surveying instrument 1 with the coordinate of the measuring point are stored.

The center of the image displayed on the display unit 44 is an origin point, which corresponds to the origin point of the image pickup element 31. Further, on the display unit 44, an image is displayed based on the image data from the image pickup element 31, and a photodetecting condition of the image pickup element 31 is displayed at a ratio of 1:1.

Figure 3:
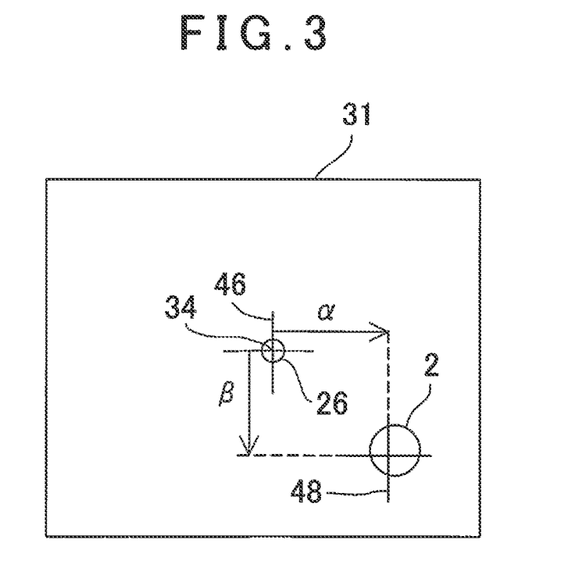
FIG. 3 is an explanatory drawing to show an image acquired by the surveying instrument according to the first embodiment of the present invention.

FIG. 3 shows a photodetecting condition of the image pickup element 31, and in FIG. 3, for convenience purpose, a mark 46 in form of a cross is shown to indicate the origin point of the image pickup element 31. An intersection point of the mark 46 is the origin point of the image pickup element 31, and the origin point coincides with the distance measuring optical axis 33 and the laser pointer optical axis 34.

The reflection light of the laser pointer beam 26 is received at the center (the origin point) of the image pickup element 31, and the tracking light reflected by the target 2 is received at a position separated by an amount of offset angle as set up, from the origin point of the image pickup element 31. In the figure, conditions deviated by $\alpha$ in horizontal direction (x-axis direction) and deviated by $\beta$ in vertical direction (y-axis direction) are shown.

In FIG. 3, a mark 48 in form of a cross is shown at a position separated from the origin point by an amount of offset angle for convenience purpose and an intersection of the mark 48 coincides with the tracking optical axis 49. In the present embodiment, by feedback control of the horizontal rotary unit 8 and a horizontal shaft motor (not shown), the surveying instrument main unit 7 tracks the target 2 so that the target 2 is positioned (so that the reflected tracking light is received) within a predetermined distance on the image pickup element 31 from the tracking optical axis 49.

Figure 4:
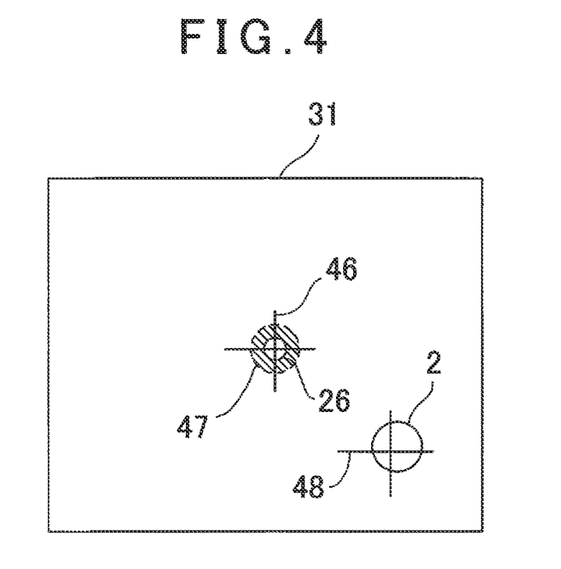
FIG. 4 is an explanatory drawing to show another example of an image acquired by the surveying instrument according to the first embodiment of the present invention.

It is to be noted that although a reflection light of the laser pointer beam 26 is shown in FIG. 3 for convenience purpose, in fact, processing is carried out such as invalidating of the signal from pixels out of the pixels of the image pickup element 31, included in the predetermined range where reflection light of the laser pointer beam 26 is received, and the like. For instance, as shown in FIG. 4, a mask processing to apply a mask 47 on the reflection light is carried out so that a reflection light of the laser pointer beam 26 is not detected by the image pickup element 31. Since the reflection light of the laser pointer beam 26 is not detected, it is possible to prevent the surveying instrument main unit 7 from tracking of the reflection light of the laser pointer beam 26 due to erroneous operation, and to stabilize a tracking operation.

It is to be noted that a wavelength selection filter to cut the wavelength of the laser pointer beam 26 may be provided on the tracking unit 20 so that the reflection light of the laser pointer beam 26 is not received by the image pickup element 31.

Images or the like acquired by the surveying instrument 1 are transmitted via the communication unit 38 and are received by the controller 3 via the communication unit 43 and are displayed on the display unit 44. Further, when instructions (commands) such as tracking start and tracking stopped and starting of distance measurement are inputted via the operation unit 45, each of the commands is transmitted to the communication unit 38 via the communication unit 43 and inputted to the surveying instrument 1 via the communication unit 38.

When a guidance is carried out by the laser pointer beam 26, the operator carries the target 2 and moves to a point near the measuring point under the condition that the laser pointer beam 26 is projected, the tracking light is emitted and the tracking of the target 2 is started.

At this moment, in the image pickup element 31, the reflection light from the target 2 (hereinafter referred as "tracking reflection light") is received at a position (a position indicated by the mark 48) offset from the origin point (the distance measuring optical axis 33). By moving the target 2, the surveying instrument main unit 7 tracks the target 2 so that the photodetecting position of the tracking reflection light from the target 2 on the image pickup element 31 will be within a predetermined range on the tracking optical axis 49 as the center.

Figure 5:
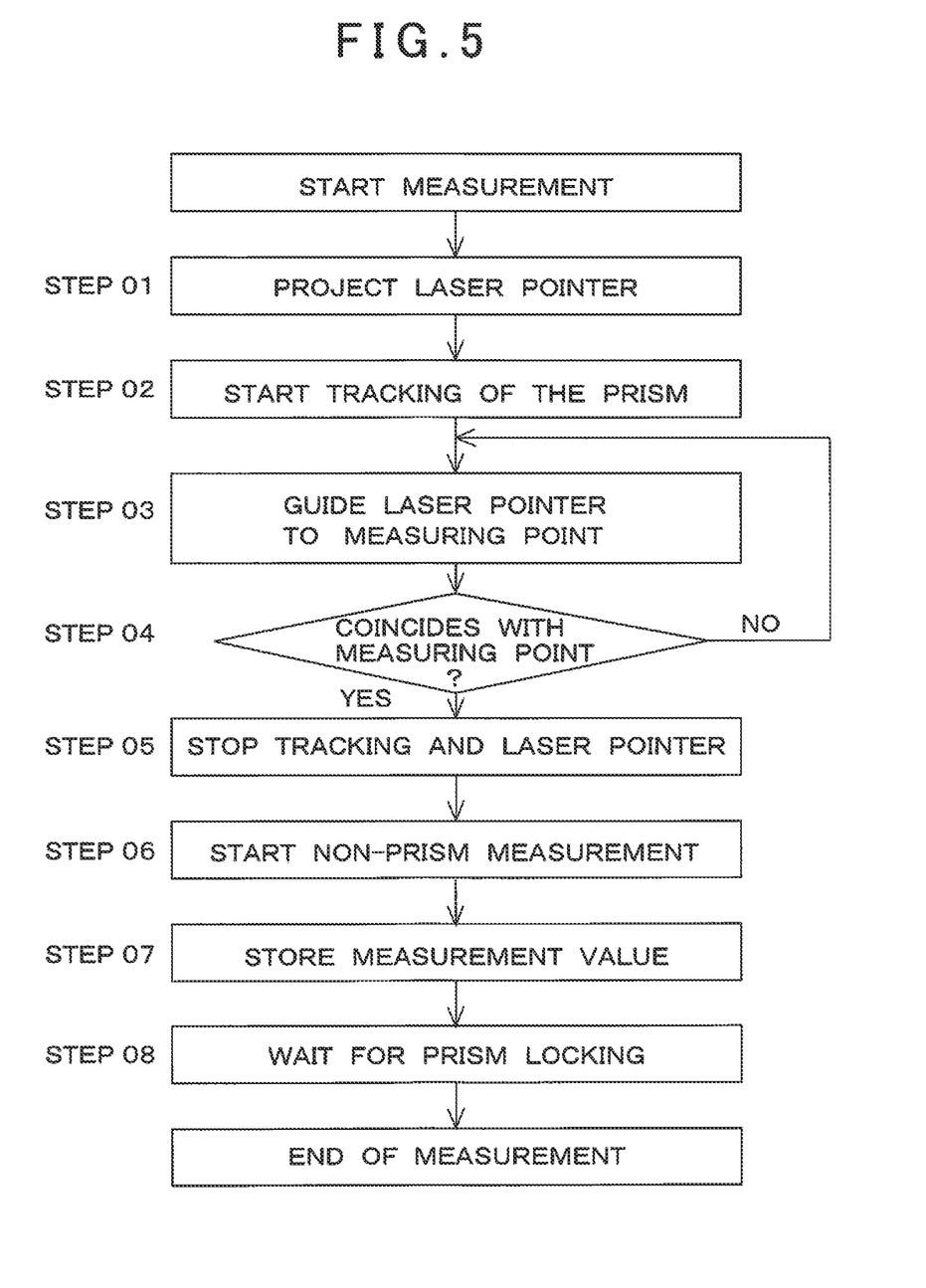
FIG. 5 is a flowchart to explain a measurement of a measuring point by the surveying instrument according to the first embodiment of the present invention.

Next, by referring to the flowchart of FIG. 5, a description will be given on a measuring of the measuring point by the surveying instrument 1 in the first embodiment. It is to be noted that distance measurement is carried out by non-prism measurement.

(Step 01) The surveying instrument 1 is set up at a known position. When starting the measurement by the surveying instrument 1, the tracking optical axis 49 is offset at a known value from the distance measuring optical axis 33 and the laser pointer optical axis 34. It is to be noted that in a case where the offset amount is fixed, this procedure may be omitted. Next, by inputting the starting of projection of the laser pointer beam 26 by the controller 3, the laser pointer projecting unit 30 is driven, and the laser pointer beam 26 is projected.

(Step 02) Next, by inputting the starting of tracking of the target 2 by the controller 3, a tracking light is projected from the tracking unit 20. When a tracking reflection light from the target 2 is received by the tracking unit 20, the tracking is started. Following a moving of the target 2, the surveying instrument main unit 7 is rotated and moved in a horizontal direction via the horizontal rotary unit 8 so that the tracking reflection light is received by the image pickup element 31, and the telescope unit 12 is rotated in a vertical direction via the horizontal shaft 13.

(Step 03) After the tracking is started, the operator moves the target 2 to a point near the measuring point and the laser pointer beam 26 is guided to the measuring point while visually inspecting the measuring point and the projecting point of the laser pointer beam 26.

(Step 04 and Step 05) After guiding the laser pointer beam 26 to the measuring point, it is judged whether or not the projecting point of the laser pointer beam 26 coincides with the measuring point. In a case where it is judged that the projecting point of the laser pointer beam 26 does not coincide with the measuring point, guiding of the laser pointer beam 26 is performed again. Further, in a case where it is judged that the projecting point of the laser pointer beam 26 coincides with the measuring point, the tracking and the projection of the laser pointer beam 26 are stopped via the controller 3.

(Step 06) After the tracking and the projecting of the laser pointer beam 26 has stopped, by inputting the starting of measurement via the controller 3, a command to start the measurement is transmitted to the surveying instrument 1 from the controller 3. The surveying instrument 1 starts the measurement of the measuring point and a non-prism distance measurement and an angle measurement are carried out. At this time, since the distance measuring optical axis 33 coincides with the laser pointer optical axis 34, there is no need to correct a horizontal angle and a vertical angle when the measurement of the measuring point is performed.

(Step 07) After measuring the measuring point, a distance to the measuring point and an angle of the measuring point (horizontal angle and vertical angle) are stored in the storage part 37.

(Step 08) After the measurement result is stored, the surveying instrument main unit 7 is driven so that the reflection light (i.e. tracking reflection light) from the target 2 is positioned within the predetermined range with the tracking optical axis 49 as the center. Prism lock processing is performed in order to prepare a condition capable of tracking the target 2, and a condition capable of performing the next measurement is prepared.

It is to be noted that in a case where the measurement is performed at only one measuring point, Step 08 may be omitted.

Further, in a case where the measurement is performed at a plurality of measuring points, the process of Step 01 and Step 02 is carried out again, and after the projection of the laser pointer beam 26 and the tracking have been started, the operator moves the target 2 and guides the laser pointer beam 26, and the process of Step 05 to Step 08 is performed.

In a case where it is difficult to visually confirm the next measuring point, such as a case where the distance between the measuring points is too far or in a case where the place of the measuring point is not known, after the target 2 is moved to an approximate position based on the guiding information as displayed on the display unit 44, the process of Step 01 to Step 08 may be carried out again.

As described above, in the first embodiment, the laser pointer optical axis 34 of the laser pointer beam 26 is offset from the tracking optical axis 49 for tracking the target 2, and the laser pointer beam 26 is projected without being reflected by the target 2. Therefore, the operator can manually guide the laser pointer beam 26 to the measuring point while visually watching the projecting point of the laser pointer beam 26.

Therefore, since it is not necessary to perform sighting within the limited visual field of the sighting telescope, it is possible to easily specify the measuring point. Further, even at a place where a wall surface with few features and the same degree of brightness continuously exists, at a place with periodic patterns, or at a dark place, it is possible to guide the laser pointer beam 26 to the measuring point in a reliable manner, and this contributes to the improvement of working efficiency.

Further, since it is not necessary for the operator to select the measuring point by watching the display unit 44 of the controller 3 every time, it is possible to directly guide the laser pointer beam 26 without watching the display unit 44, and it is possible to directly confirm whether the laser pointer optical axis 34 coincides with the measuring point or not.

Further, since the laser pointer beam 26 is to be guided to the measuring point near the measuring point and there is no need to perform sighting of the measuring point from the direction of the surveying instrument 1, even in a case where the distance between the measuring point and the surveying instrument 1 is distant from each other, it is possible to guide the laser pointer beam 26 to the measuring point in a quick and an assured manner.

Further, since the laser pointer beam 26 is guided to the measuring point by visual inspection while moving the target 2 manually and not via the controller 3, even when guiding is difficult to perform sensually while visually watching the display unit 44 such as the case where point group to be measured is tilted, or the like, a guiding is accomplished in an easy manner by visual inspection.

Next, referring to FIG. 6, description will be given on a second embodiment of the present invention. It is to be noted that in FIG. 6, the same component as shown in FIG. 3 is referred by the same symbol, and detailed description is omitted.

In the second embodiment, the tracking optical axis 49 (see FIG. 1) coincides with the distance measuring optical axis 33 (see FIG. 1), and the laser pointer optical axis 34 (see FIG. 1) is offset by an amount of the predetermined offset angle from the tracking optical axis 49 and the distance measuring optical axis 33.

Further, the tracking optical axis 49 is positioned at the center of the image pickup element 31 and the laser pointer optical axis 34 is offset from the tracking optical axis 49 by an amount of the offset angle as set up. For instance, as shown in FIG. 6, the laser pointer optical axis 34 is offset only in the direction of Y-axis from the tracking optical axis 49 (shown by "β" in FIG. 6), and the laser pointer optical axis 34 is positioned out of the photodetection range of the image pickup element 31.

When performing a measurement, an offset angle of the laser pointer optical axis 34 is set up. It is to be noted that similarly to the first embodiment, in a case where the offset angle is set in a fixed manner, the set up procedure of the offset angle may be omitted. A tracking light is projected from the tracking unit 20, the tracking reflection light is received by the image pickup element 31 and the tracking is started. The operator moves the target 2 to the measuring point and by making the surveying instrument 1 track the target 2, the laser pointer beam 26 is guided to the measuring point. After the guiding is completed, when the completion of the guiding is inputted to the controller 3, a guiding completion signal is transmitted to the surveying instrument 1. The arithmetic part 36 is configured so as to rotate the telescope unit 12 by the amount of the offset angle as set up, to move the distance measuring optical axis 33 to the measuring point and to perform distance measurement and angle measurement.

Figure 6:
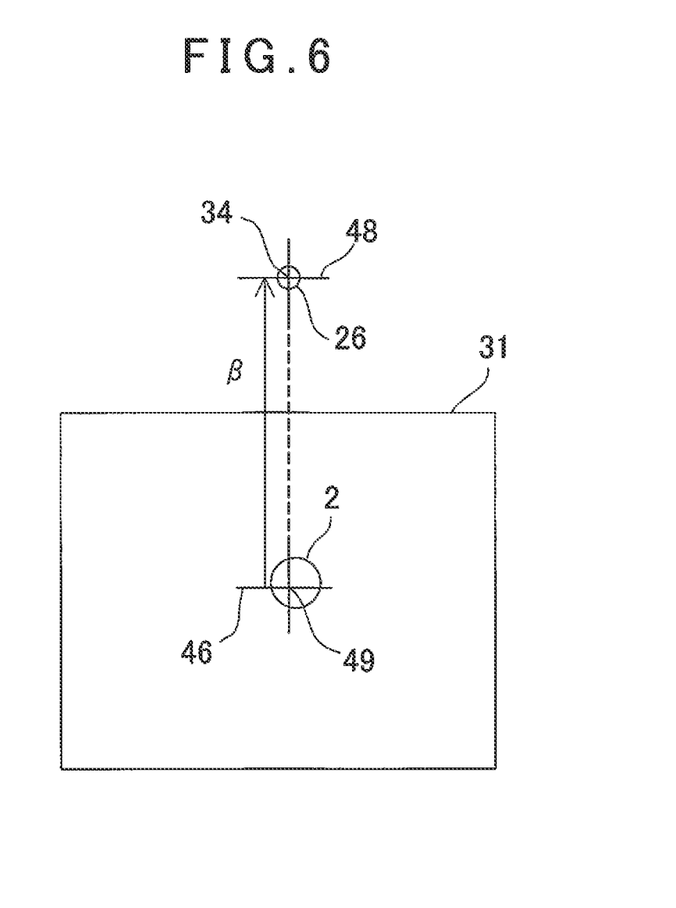
FIG. 6 is an explanatory drawing to show an image acquired by a surveying instrument according to a second embodiment of the present invention.

In the second embodiment, it is not necessary for the laser pointer optical axis 34 of the laser point beam 26 in the tracking process to be within the image pickup range, and as shown in FIG. 6, if the offset angle is set up so that the reflection light of the laser pointer beam 26 is deviated from the image pickup range, the reflection light of the laser pointer beam 26 is not reflected in the image pickup element 31. As a result, it is possible to prevent an erroneous operation in which the surveying instrument 1 tracks the reflection light of the laser pointer beam 26 and it is possible to improve the stability of the tracking. Further, unlike the first embodiment, performing of mask processing and cutting of the laser pointer beam 26 by filter and the like will not be necessary.

Further, if it is so arranged that a mechanism, capable of changing the tilting of the laser pointer optical axis 34, is added to the laser pointer projecting unit 30 (see FIG. 2), and the mechanism is capable of setting up in an arbitrary manner, the offset angle between the laser pointer optical axis 34 and the tracking optical axis 49, even at a place where the guiding is difficult to perform near the measuring point such as a case where the measuring point is on the ceiling, or the like, it is possible to easily guide to the measuring point manually while visually watching the projecting point of the laser pointer beam 26, which contributes to the improvement of workability and to the improvement of working efficiency.

It is to be noted that in the second embodiment, the laser pointer optical axis 34 of the laser pointer beam 26 is designed as being offset only in Y-axis direction, but similarly to the first embodiment, the offset may be in two directions, i.e. X-axis direction and Y-axis direction.

Figure 7A:
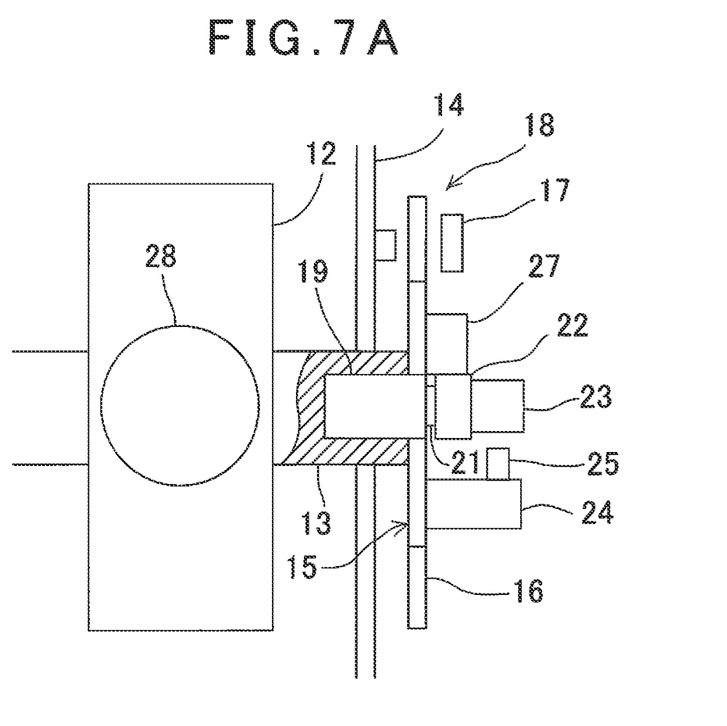
FIG. 7A is a front view of the surveying instrument and FIG. 7B is a side view of the surveying instrument.
Figure 7B:
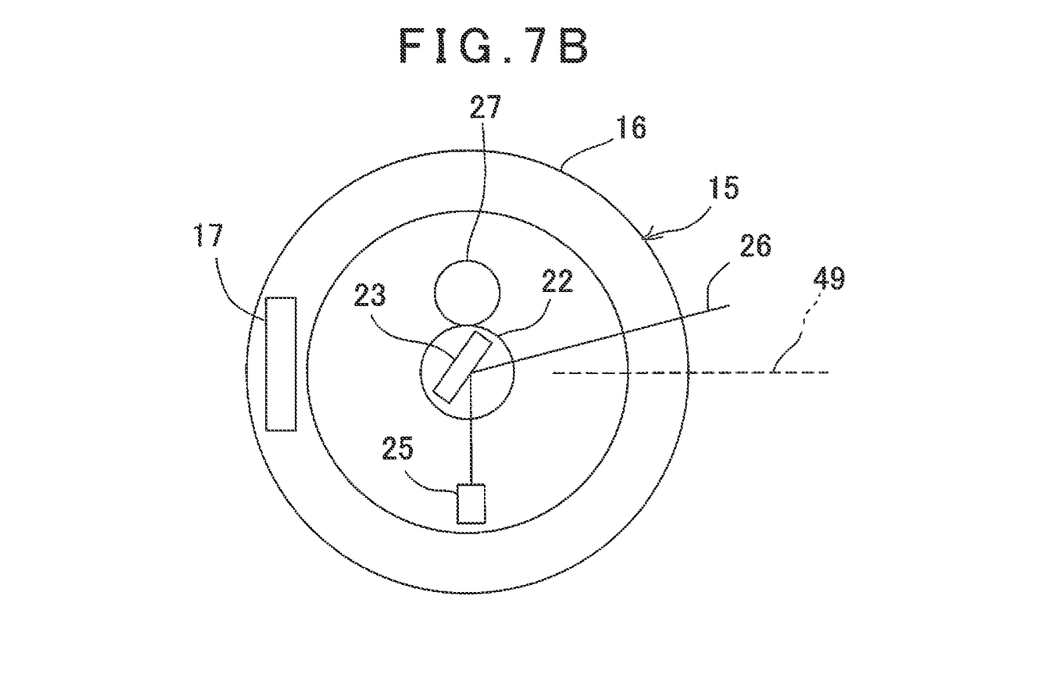

Next, referring to FIG. 7A and FIG. 7B, a description will be given on a third embodiment.

In the third embodiment, a laser pointer 25 is provided outside the telescope unit 12, and further, it is so arranged that the offset angle of the laser pointer optical axis 34 is capable of being freely set with respect to the optical axis of the telescope unit 12. In FIG. 7A and FIG. 7B, the same component as shown in FIG. 1 is referred by the same symbol.

The telescope unit 12 is provided on a casing 14 via a horizontal shaft 13, and the telescope unit 12 is adapted to rotate integrally with the horizontal shaft 13. In FIG. 7A, reference numeral 28 denotes a sighting telescope.

On an end surface of the horizontal shaft 13, a circular plate 15 is fixed concentrically with the horizontal shaft 13. On a peripheral portion of the circular plate 15, an encoder pattern 16 such as an absolute encoder pattern or the like is formed. Further, a reading unit 17 is provided on the casing 14 and by detecting a rotation amount of the encoder pattern 16 by the reading unit 17, a rotation amount of the telescope unit 12, i.e. the vertical angle, is detected. The encoder pattern 16 and the reading unit 17 make up together a vertical angle detector 18.

On an end portion of the horizontal shaft 13, an offset shaft 19 concentric with the horizontal shaft 13 and penetrating the circular plate 15 is provided in such a manner that the offset shaft 19 is capable of being relatively rotatable in the horizontal shaft 13. On the offset shaft 19, an auxiliary shaft 22 is provided via a joint 21 and the auxiliary shaft 22 is protruded from the end surface of the horizontal shaft 13. Further, the auxiliary shaft 22 is adapted to be rotatable and tiltable via the joint 21 with the horizontal shaft 13 as a center. Further, a mirror 23 is provided on an end surface of the offset shaft 19 and a reflection surface of the mirror 23 is set so as to include an axial center of the offset shaft 19.

On the circular plate 15, a laser pointer supporting member 24 is protruded. The laser pointer 25 is provided on the laser pointer supporting member 24. The laser pointer optical axis 34 of the laser pointer 25 is set so as to perpendicularly cross the axial center of the offset shaft 19 and to enter a reflection surface of the mirror 23. The laser pointer beam 26 projected from the laser pointer 25 is arranged so as to be reflected in the direction of a measuring point by the mirror 23.

Further, on the circular plate 15, an offset shaft motor 27 is provided, which is an offset driving unit where a motor and an encoder are integrated together. The offset shaft motor 27 is capable of being rotated and driven in two axial directions. The offset shaft motor 27 is arranged so as to relatively rotate the offset shaft 19 in the direction of Y-axis with respect to the horizontal shaft 13 and tilts the auxiliary shaft 22 in the direction of X-axis (i.e. a perpendicular direction with respect to Y-axis) around the joint 21. Further, the offset shaft motor 27 is capable of detecting rotation amount of the offset shaft 19 in X-axis direction and in Y-axis direction respectively. The offset shaft 19 and the offset shaft motor 27 make up together an offset unit 40 (see FIG. 2).

When the offset shaft 19 is rotated in Y-axis direction and the auxiliary shaft 22 is tilted in X-axis direction by the offset shaft motor 27, the mirror 23 is rotated and tilted integrally with the joint 21 in two directions, and thereby it becomes possible to change the projecting direction, i.e. offset angle, of the laser pointer beam 26 reflected by the mirror 23. When the offset is completed, the offset shaft 19 rotates integrally with the horizontal shaft 13 and the offset angle is fixed.

Figure 8B:
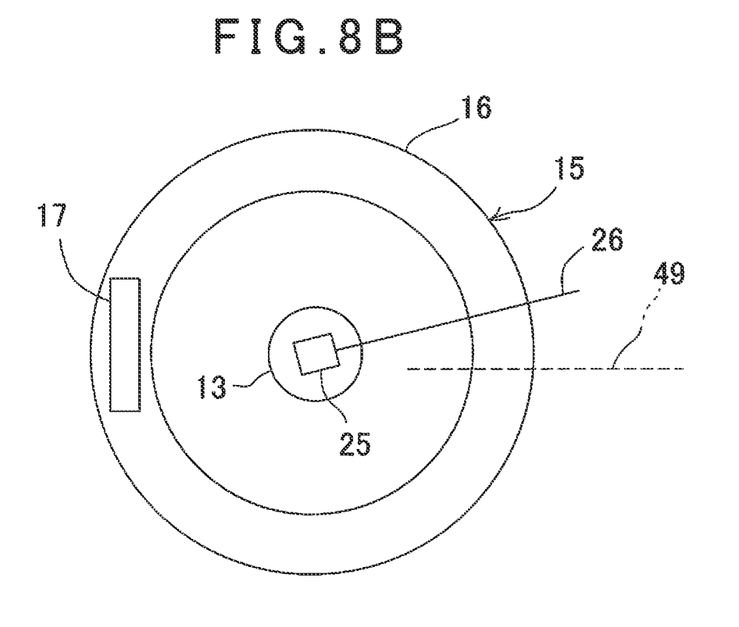

It is to be noted that in a case where the offset angle is determined in advance and an adjustment is not needed, the offset shaft 19 is not provided and the laser pointer 25 may be mounted on the horizontal shaft 13 directly, as shown in FIG. 8A and FIG. 8B.

Figure 9:
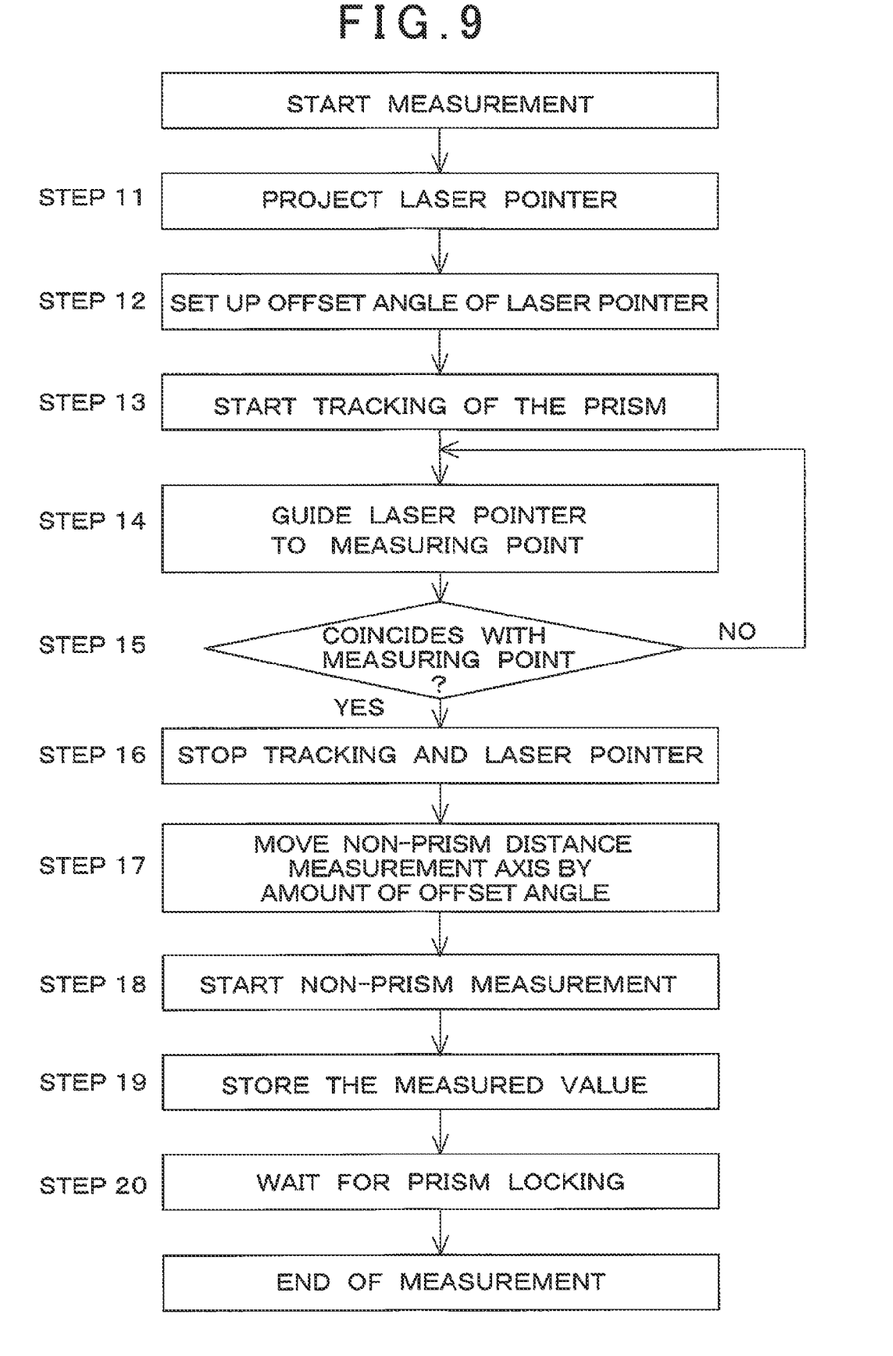
FIG. 9 is a flowchart to explain measurement of a measuring point by the surveying instrument according to the third embodiment of the present invention.

Next, referring to a flowchart shown in FIG. 9, a description will be given on the measurement of the measuring point by the surveying instrument 1 in the third embodiment.

(Step 11) First, the laser pointer 25 is driven and the laser pointer beam 26 is projected.

(Step 12) Next, an offset angle of the laser pointer optical axis 34 is set up at a known value via the operation unit 45 (see FIG. 2) of the controller 3 and an optical axis of the laser pointer beam 26 is offset.

(Step 13) After the offset of the optical axis of the laser pointer beam 26, a tracking light is emitted from the surveying instrument main unit 7 via the controller 3 and a tracking of the target 2 is started.

(Step 14) After starting the tracking, the operator moves the target 2 to a point near the measuring point and guides the laser pointer beam 26 to the measuring point while visually watching the projecting point of the laser pointer beam 26.

(Step 15 and Step 16) After the laser pointer beam 26 is guided to the measuring point, it is judged whether or not the projecting point of the laser pointer beam 26 is coincided with the measuring point. In a case where it is judged that the projecting point of the laser pointer beam 26 does not coincide with the measuring point, the guiding of the laser pointer beam 26 is performed again. Further, in a case where it is judged that the projecting point of the laser pointer beam 26 coincides with the measuring point, the tracking and the projection of the laser pointer beam 26 are stopped via the controller 3 and the completion of the guiding is inputted. It is to be noted that the projection of the laser pointer beam 26 may be stopped by inputting the completion of the guiding.

Figure 2:
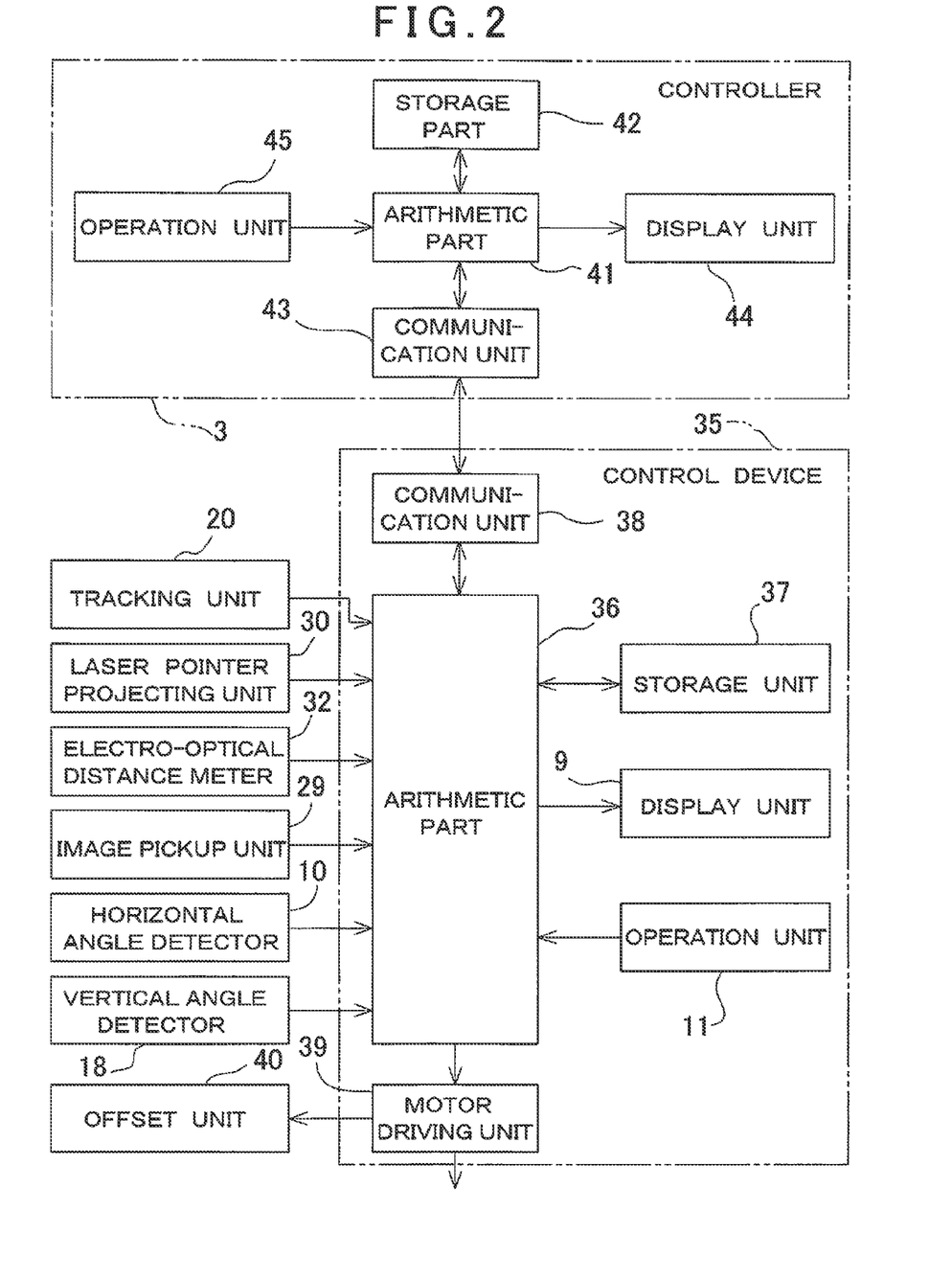
FIG. 2 is a block diagram to show a control system of a surveying instrument and a controller according to a first embodiment of the present invention.

(Step 17) After the stopping of projection of the laser pointer beam 26 and the tracking, when the completion of the guiding is inputted, a signal of the completion of the guiding is transmitted to the communication unit 38 (see FIG. 2) of the surveying instrument 1 from the communication unit 43 (see FIG. 2). The arithmetic part 36 (see FIG. 2) rotates the horizontal shaft 13 in a direction reverse to the offset by an amount of the offset angle as set up in Step 12 based on the signal of the completion of the guiding, and the distance measuring optical axis 33 is sighted to the measuring point.

(Step 18) Next, by inputting the starting of measurement via the controller 3, the measurement of the measuring point is started by the surveying instrument 1 and non-prism distance measurement and angle measurement are carried out.

(Step 19) After the measuring of the measuring point, distance to the measuring point and angle of the measuring point are stored in the storage part 37 (see FIG. 2).

(Step 20) After storing the measurement result, the surveying instrument main unit 7 is driven so that the target 2 is positioned within a predetermined range with the tracking optical axis 49 as the center. Prism lock processing is performed in order to prepare a condition capable of tracking the target 2, and a condition capable of performing the next measurement is prepared.

It is to be noted that in a case where the measuring point to be measured is only at one point, similarly to the first embodiment, the process of Step 20 may be omitted.

Further, although an omnidirectional prism 5 (see FIG. 1) is used as the target 2 in the first embodiment and the second embodiment, it is needless to say that other reflection member such as a reflection tape, etc. may be used.

Further, in both the first embodiment and the second embodiment, in a case where only an angle measurement of the measuring point would suffice, there is no need to perform a distance measurement of the measuring point. Since an angle measurement is performed with respect to the distance measuring optical axis 33 when the laser pointer 25 indicates the measuring point and further an angle measurement can be performed on the measuring point if only the offset amount is corrected, the function of non-prism measurement may be omitted.

The invention claimed is:

1. A surveying instrument capable of performing a non-prism measurement comprising a laser pointer for projecting a visible laser pointer beam, a measuring unit for emitting a distance measuring light via a telescope unit, for performing distance measurement on a measuring point by receiving a reflected light and for measuring an angle of said measuring point, an image pickup unit for acquiring an image including a target via said telescope unit, a tracking unit for emitting a tracking light via said telescope unit and for tracking said target by receiving a reflection light from said target, a driving unit for rotating said telescope unit in horizontal direction and in vertical direction and a control device for controlling said driving unit so that the reflection light of said tracking light from said target will be positioned at a predetermined position on an image pickup element of said image pickup unit, wherein an optical axis of said distance measuring light and an optical axis of said tracking light are in a known relationship, an optical axis of said laser pointer beam is offset from an optical axis of said tracking light by a predetermined angle, said laser pointer beam is projected at the same time as said tracking light and projects to said measuring point or to a point near said measuring point.

2. A surveying instrument according to claim 1, wherein an optical axis of said distance measuring light of said measuring unit is coaxial with an optical axis of said laser pointer beam, the optical axis of said laser pointer beam is positioned at a center on said image pickup element and the optical axis of said tracking light is offset from the optical axis of said laser pointer beam.

3. A surveying instrument according to claim 1, wherein said control device performs mask processing with respect to said image pickup element so that a photodetection signal of the reflection light of said laser pointer beam is not issued.

4. A surveying instrument according to claim 1, wherein the optical axis of said distance measuring light of said measuring unit is coaxial with the optical axis of said tracking light, the optical axis of said laser pointer beam is offset from the optical axis of said tracking light, wherein after guiding said laser pointer beam to a measuring point, said control device controls said driving unit so that the optical axis of said distance measuring light is moved in order to turn a set up offset angle to 0.

5. A surveying instrument according to claim 1, further comprising a horizontal shaft for rotating said telescope unit in a vertical direction, an offset shaft relatively rotatable with respect to said horizontal shaft, an offset driving unit for rotating said offset shaft and a mirror installed on an end surface of said offset shaft and for reflecting said laser pointer beam, wherein an offset angle of said laser pointer beam is changed by relatively rotating said offset shaft with respect to said horizontal shaft.

6. A surveying instrument comprising a laser pointer for projecting a visible laser pointer beam, a measuring unit for emitting a distance measuring light via a telescope unit and for performing angle measurement of a measuring point by receiving a reflection light, an image pickup unit for acquiring an image including a target via said telescope unit, a tracking unit for tracking said target by emitting a tracking light via said telescope unit and by receiving a reflection light from said target, a driving unit for rotating said telescope unit in a horizontal direction and in a vertical direction, and a control device for controlling said driving unit so that a reflection light of said tracking light from said target is positioned at a predetermined position on an image pickup element of said image pickup unit and for performing of tracking said target, wherein an optical axis of said distance measuring light and an optical axis of said tracking light are in a known relationship, an optical axis of said laser pointer beam is offset from an optical axis of said tracking light by a predetermined angle, said laser pointer beam is projected at the same time as said tracking light and projects to said measuring point or to a point near said measuring point.

* * * * *